(12) United States Patent
Dean

(10) Patent No.: US 6,201,802 B1
(45) Date of Patent: *Mar. 13, 2001

(54) METHOD AND APPARATUS FOR ANALYZING BASE STATION TIMING

(75) Inventor: Richard F. Dean, Boulder, CO (US)

(73) Assignee: Qualcomm Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,804

(22) Filed: Aug. 29, 1997

(51) Int. Cl.[7] .............. H04Q 7/00; H04B 7/216; H04L 12/66
(52) U.S. Cl. .......... 370/350; 370/356; 370/335; 370/328; 455/52.3; 455/54.1
(58) Field of Search ............ 370/356, 252, 370/335, 208, 376, 342, 503, 508, 331, 328; 375/200, 219, 220, 344, 371, 208; 455/65, 504, 506

(56) References Cited

U.S. PATENT DOCUMENTS

| | | | |
|---|---|---|---|
| 5,267,261 | * 11/1993 | Blakeney, II et al. | 375/1 |
| 5,430,760 | * 7/1995 | Dent | 375/20 |
| 5,697,055 | * 12/1997 | Gilhousen et al. | 455/33.2 |
| 5,710,768 | * 1/1998 | Ziv et al. | 370/342 |
| 5,710,977 | * 1/1998 | Nakazawa | 455/65 |
| 5,734,639 | * 3/1998 | Bustamante et al. | 370/208 |
| 5,872,774 | * 2/1999 | Wheatley, III et al. | 370/335 |

FOREIGN PATENT DOCUMENTS

| | | |
|---|---|---|
| 0431956 | 6/1991 | (EP) . |
| 0720407 | 7/1996 | (EP) . |
| 0752766 | 1/1997 | (EP) . |
| 9616524 | 5/1996 | (WO) . |
| 9635305 | 11/1996 | (WO) . |

\* cited by examiner

Primary Examiner—Huy D. Vu
Assistant Examiner—M. Phan
(74) Attorney, Agent, or Firm—Philip Wadsworth; Kent Baker; Sean English (57) ABSTRACT

A base station timing analyzer measures the timing performance of a base station from within the base station coverage area without interruption or degradation of the system performance. The timing analyzer has a dummy signal generation mechanism that produces a dummy signal output based on a universal time input. An antenna couples a signal from an operating base station from a wireless link. A summer sums together the dummy signal and signal from the wireless link. A demodulation element receives the summed signal and searches for and demodulates each of the signals. A comparison unit compares the output of the demodulation element to determine the timing performance of the base station to provide an indication of the absolute time offset of the base station signal.

29 Claims, 6 Drawing Sheets

METHOD AND APPARATUS FOR ANALYZING BASE STATION TIMING

BACKGROUND OF THE INVENTION

I. Field of the Invention

This invention relates generally to timing analysis and, more particularly, to detection of timing errors in generation of signals.

II. Description of the Related Art

In cellular telephone systems, personal communications systems and wireless local loop systems using a code division multiple access (CDMA) coding technique, remote units (typically cellular telephones) use a common frequency band for communication with all base stations in the system. Use of a common frequency band adds flexibility and provides many advantages including the simultaneous reception of communication signals exchanged between sets of remote units and base stations. An over-the-air interface for implementing a CDMA base cellular telephone system is defined in the IS-95 standard promulgated by the Telecommunications Industry Association (TIA), as well as other well known standards bodies. Additionally, a cellular telephone system configured substantially in accordance with the use of IS-95 is described in U.S. Pat. No. 5,103,459 entitled "System and Method for Generating Signal Waveforms in a CDMA Cellular Telephone System" assigned to the assignee of the present invention and incorporated herein by reference.

In a typical CDMA communications systems, both the remote units and the base stations discriminate the simultaneously received signals from one another via modulation and demodulation of the transmitted data with high frequency pseudo-noise (PN) codes, orthogonal Walsh codes, or both. For example, IS-95 separates the set of transmission from the same base station by the use of different Walsh codes for each transmission, while the transmissions from different base stations are distinguished by the use of a uniquely offset PN code.

In order for a communication to be conducted properly in a CDMA system the state of the particular codes selected must be synchronized at the transmit and receive systems. Synchronization is achieved when the state of the codes at the receive system are the same as those in the transmit system, less some offset to account for any processing and transmission delay. In an IS-95 compliant CDMA system, such synchronization is facilitated by the transmission of a pilot channel from each base station comprised of the repeated transmission of the uniquely offset PN code (pilot PN code). In addition to facilitating synchronization, the pilot channel allows identification of each base station relative the other base stations located around it using the pilot channel phase offset.

To synchronize with the transmission from a base station, a remote unit performs repeated time offset searches with the pilot PN code until the pilot channel is detected. The remote unit is equipped with a searching element for performing such a search that also allows the remote unit to track the signal strength of the pilot signal from a group of base stations including the neighboring base stations. Further information on searching processes can be found in co-pending U.S. patent application Ser. No. 08/316,177 entitled "MULTIPATH SEARCH PROCESSOR FOR A SPREAD SPECTRUM MULTIPLE ACCESS COMMUNICATION SYSTEM" which is assigned to the assignee of the present invention and incorporated herein. Once a first pilot channel is detected, the detection of other pilot channels is made easier by continuing to search at the various known offsets relative to the detected pilot channel. This searching may further be facilitated by transmission of suggested search offsets from the base station to the remote unit based on the known configuration of the cellular telephone system. The searching element in the remote unit begins its search at the suggested offset or offsets, and therefore is more likely to detect the pilot channel that if the search was initiated at some random start point.

Remaining synchronized with each base station when a telephone call or other communication is in progress is especially useful as it assists in conducting a soft handoff rapidly. When a soft handoff is established the remote unit is called on to begin processing transmissions from two or more base stations simultaneously. U.S. Pat. No. 5,267,261 entitled "Mobile Station Assisted Soft Handoff in a CDMA Cellular Communications System," which is assigned to the assignee of the present invention and which is incorporated herein, discloses a method and system for providing communication with the remote unit through more than one base station during the handoff process. Soft handoff can be contrasted to hard handoff where the interface with a first base station is terminated before the interface with the second base station is established. Additionally, transmit power control with a particular base station can only commence once the soft handoff has been established with that base station, further necessitating the soft handoff be conducted rapidly.

Inherent in the searching process of a remote unit is the need for the base station timing to be precisely aligned with respect to the other base stations in the system and for the base station timing to remain precisely aligned during the searching process. Either a drifting time or a constant absolute error in the time may cause the searching mechanism to degrade or fail. If the searching mechanism fails, soft handoff may not be established. It should also be noted that if soft handoff is not established, power control does not operate properly. If power control does not operate properly, system performance and capacity fall. One or more systems for base station and remote unit power control are disclosed in U.S. Pat. Nos. 5,056,109, 5,265,119, 5,257,283 and 5,267,262 which are incorporated herein.

Therefore, base station timing is extremely important to system operation. To illustrate the importance of base station timing, IS-95 states that each base station shall transmit its pilot signal at the given time offset with an error that should be less than 3 microseconds and an error that shall be less than 10 microseconds in order to establish uniformity throughout the industry. This language means that, although 10 microseconds of offset error may be tolerated, the association highly recommends having an error of less than 3 microseconds. Base stations are typically equipped with universal time sources such as global positioning satellite (GPS) receivers in order to achieve the precision required by IS-95. The universal time output from a GPS receiver is input to the base station which uses the universal time to align, among other things, its pilot signal to the proper offset.

Despite the restrictive time requirements, a CDMA system is sufficiently robust that it may continue to operate when a failure in the GPS system or other timing mechanism introduces a poorly synchronized base station in to the system. Such a failure would result in system performance degradation, however, and therefore would be highly undesirable. The lack of complete system failure makes detection of an unsynchronized base station difficult, even though the overall performance and capacity of the cellular telephone system may be impacted substantially. Therefore, it is advantageous to have a means by which base station timing may be tested.

However, testing base station timing is extremely difficult and imprecise using conventional methods. Conventional test methods of analyzing base station timing have consisted of connecting a conventional digital timing analyzer to test points at various locations throughout signal flow within the base station. This method is imprecise because error may be introduced in the base station timing at later points in the base station signal flow which would not be detected.

Figure 1:
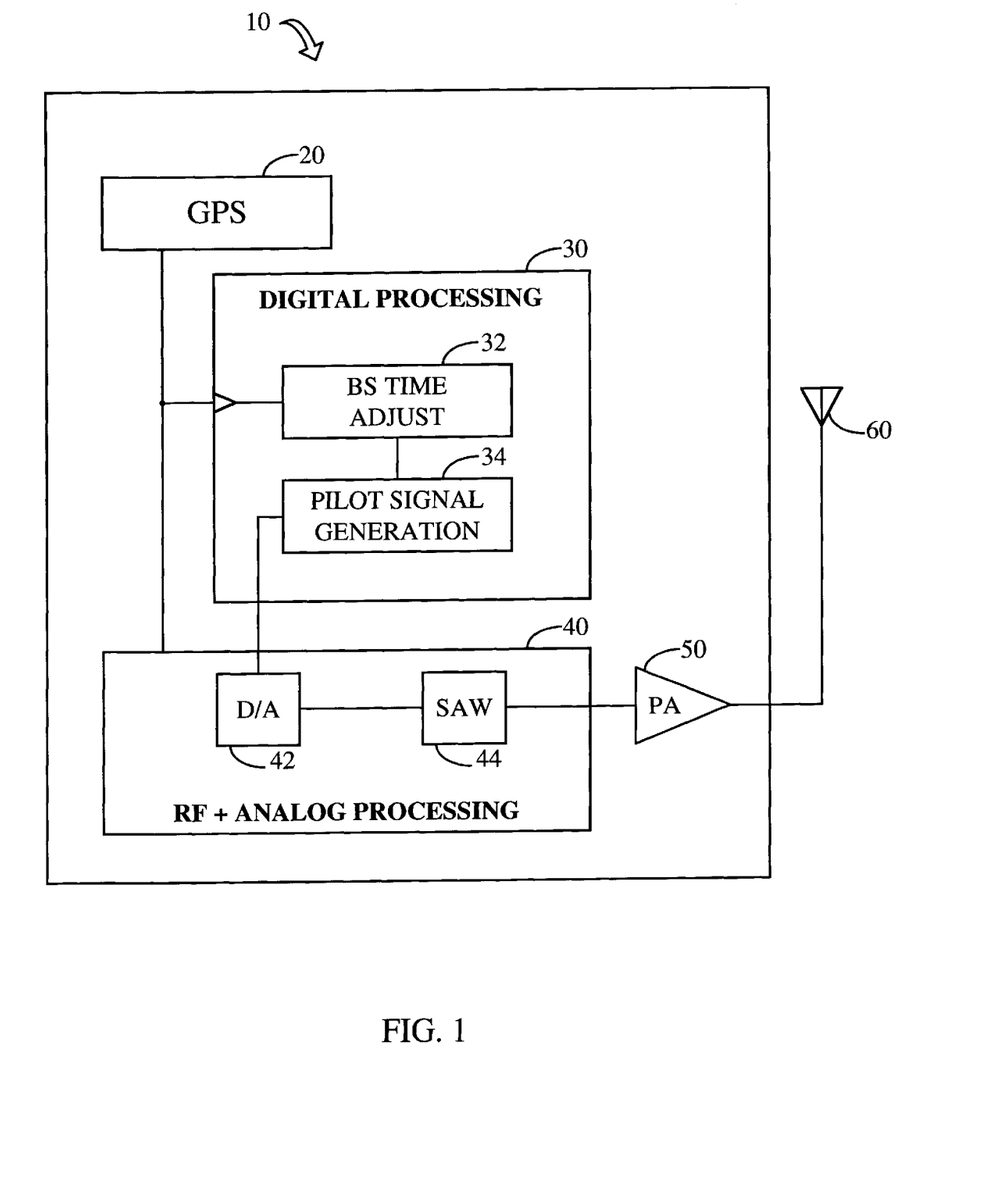
FIG. 1 is a simplified block diagram of a base station.

FIG. 1 shows a typical existing base station 10. The base station 10 is comprised of a global positioning satellite (GPS) receiver 20, a digital processing unit 30, an RF and analog processing unit 40, and power amplifier (PA) 50. Any method of acquiring timing may be used such as triangulation or cesium standard devices. In the exemplary embodiment of FIG. 1, the GPS receiver 20 is a commercially available unit. When initially powered on, the GPS receiver 20 enters a navigation mode in which it monitors signals from four different satellites to determine its exact location on the earth. Once it has determined its own location, the GPS receiver 20 enters timing mode and monitors a signal from a single satellite to determine 'absolutely'the time of day on a continuous basis.

The GPS receiver 20 provides a timing signal to a digital processing unit 30 and a radio frequency (RF) and analog processing unit 40. The digital processing unit 30 uses the timing signal to create a pilot signal and for various other functions. For reasons described below, the absolute time as received from the GPS receiver 20 must be adjusted by the base station to accommodate delays within the base station. For example, the GPS receiver can have signals bias and errors due to multipath transmissions. The adjustment is made in a base station timing adjust unit 32 which essentially advances the absolute time value received from the GPS receiver 20 by a fixed amount of time to account for delay introduced by the base station 10 as a whole so that the signal generated at an antenna 60 represents the correct time as closely as possible.

The output of the base station time adjust unit 32 is used, among other uses, to create a pilot signal in a pilot signal generation unit 34. The pilot signal generation unit 34 creates a digital representation of the signal which shall be transmitted. The digital signal is passed to the RF and analog processing unit 40.

Within the RF and analog processing unit 40, the digital signal is converted to an analog signal using a digital to analog converter 42. The resulting analog signal is subject to several processing actions within the RF and analog processing unit 40 including filtering and upconversion. The analog signal is passed through a standing acoustic wave (SAW) filter 44 and, then, to a power amplifier 50 and the antenna 60 for transmission over the wireless link. Each process within the digital processing unit 30, the RF and analog processing unit 40, the power amplifier 50 and the antenna 60 introduces some delay.

One of the main sources of delay within the base station 10 is the SAW filter 44. A SAW filter is ideal for use with wideband digital signals. SAW filters provide flat group delay, flat passband response and extreme rejection in the stopband. However, a SAW filter inherently introduces a rather substantial flat delay. For example, a typical SAW filter used in a cellular base station may introduce 20 microseconds of delay. Obviously, the delay of the SAW filter 44 would itself cause the non-conformance with the IS-95 standard unless some correction were made.

The correction is made in the base station time adjust unit 32. At initial deployment, an end to end delay measurement is taken of the entire assembled base station. The base station time adjust unit 32 provides an artificial advancement of timing equal to the end-to-end delay measurement taken.

Even if the base station time adjust unit 32 initially compensates perfectly for the delay introduced by the base station 10, over time the timing may change. For example, the power amplifier 50 and the antenna 60 are typically exposed to environmental temperature changes while the remainder of the base station 10 is likely to be housed in a temperature controlled environment. If the delay characteristic of the power amplifier 50 and the antenna 60 change over temperature, the timing of the resultant output signal also changes with temperature. Also, it is possible for the GPS receiver 20 to malfunction and to drift in time. In addition, a phase locked loop within the RF and analog processing unit 40 may become unlocked and drift in phase introducing a continuous shift in the output time. Several modes of failure within the digital processing unit 30 may also introduce absolute or drifting timing errors such as ringing clock signals.

When a small absolute or drifting error occurs in one base station, the overall system performance of the cellular system begins to degrade. However, the failure is not typically catastrophic or easily detectable. For example, if an undetected error in base station timing causes a delayed entry into soft handoff, an unusually high error rate may be observed at neighboring base stations only when a remote unit is located within a soft handoff region of the coverage area of the errant base station.

Also note that a measurement of timing made in the base station at any other point in the process other than after the antenna 60 may not be an actual reflection of the timing of the signal produced by the base station 10.

FIG. 1 shows the base station 10 in one of the most basic environments in which it may operate. In other more elaborate configurations, many other elements may be present which may introduce timing error into the system. For example, the base station 10 may be connected to a cable television system. In such a configuration, optical elements are used to convey the signal from the base station to the coaxial television cable. Along the length of the cable, a series of radio antenna devices (RADs) couple signals to the wireless link. In such a configuration, the delay introduced becomes even more volatile and hard to measure. A similar situation may be found if optical fibers or microwave beams are used to transmit signals to remote antennas. In these more elaborate configurations, the method and apparatus of the present invention of testing base station timing from within the base station coverage area become even more essential.

The most comprehensive measure of base station timing is achieved by measuring the transmit RF signal after the signal has left the antenna. However, until the advent of the present invention, such measurements were not possible. Therefore, there has been a long felt need of the industry to have a comprehensive and precise method of measuring base station timing.

SUMMARY OF THE INVENTION

The present invention is a system and method for analyzing the timing of a base station. The timing analyzer has an antenna for receiving a signal from the base station which is under test. The antenna is placed as close as possible to the antenna of the base station under test. In the one embodiment, the base station transmits a pilot signal. The timing analyzer searches for and demodulates the pilot signal from the base station.

The timing analyzer also provides an indication of universal time. A pilot generator within the timing analyzer uses the universal time indication to create a dummy pilot signal. The timing analyzer searches for and demodulates the dummy pilot signal. The timing analyzer compares the timing of the two pilot signals to determine an absolute error in the timing of the base station. The timing analyzer may also determine drift in the timing.

An alternative embodiment of the timing analyzer of the present invention may eliminate the use of universal time and the pilot signal generator. The simplified architecture includes a handoff boundary indicator. The handoff boundary indicator aids in the positioning of the timing analyzer at a handoff boundary between two base stations, both of which or one of which may be under test. Once positioned at the handoff boundary, the timing analyzer compares the relative timing of the two pilot signals. Because the handoff boundary is typically equidistant, and hence equi-delay, from each base station, the comparison yields a reliable indication of the absolute time used by each base station. Also, one can determine the exact timing by knowing the distance to the base station being tested.

In this way, measurement of the timing of a base station may be made at the most inclusive point: from within the coverage area of the base station under test. The several embodiments of the present invention allow for the ready detection of elusive timing problems in a base station, thus, satisfying a long felt need in the industry.

BRIEF DESCRIPTION OF THE DRAWINGS

The novel features of the present invention may be better understood from the accompanying description when taken in conjunction with the accompanying drawings in which like characters refer to like parts and in which.

DETAILED DESCRIPTION OF THE PREFERRED EMBODIMENT

For convenience, the present invention is described with reference to a wireless code division multiple access (CDMA) system and the generation of a pilot signal by a base station operating in such a system. However, the present invention is suitable for a myriad of applications where precise timing is desired for proper system operation. The present invention, in the most basic embodiment, is a receive only device which can operate without interference with the system. Thus, the timing of a base station may be tested without interruption or even detection by the system under test.

As noted more extensively above, it is necessary to closely synchronize the relative timing of each base station in a digital cellular system. For example, in a CDMA cellular system, each base station transmits a common pilot signal. Each base station transmits the common pilot signal at a different code phase corresponding to a unique time offset. The remote unit uses the relative offset in time to determine the origin (i.e. the corresponding base station) for each pilot signal which it receives. The relative offset is important to the initial detection and the subsequent identification of base station pilot signals. Without the ability to detect and properly identify the pilot signals based on the offset, the remote unit would be unable to properly perform a handoff from one base station to another as the remote unit moves about within the system.

In order to preserve system integrity, the Telephone Industry Association has developed a standard to which each base station should conform. The standard is defined in "Mobile Station-Base Station Compatibility Standard for Dual-Mode Wideband Spread Spectrum Cellular Systems" TIA/EIA/IS-95 and its derivatives such as IS-95 A, generally referred to simply as IS-95. IS-95 states that each base station shall transmit its pilot signal at the given time offset with an error that should be less than 3 microseconds and shall be less than 10 microseconds. This language means that, although 10 microseconds of offset error may be tolerated by the association, the association highly recommends having an error of less than 3 microseconds. FIG. 1, as describe extensively above, may be a CDMA base station operating in compliance with IS-95.

Figure 2:
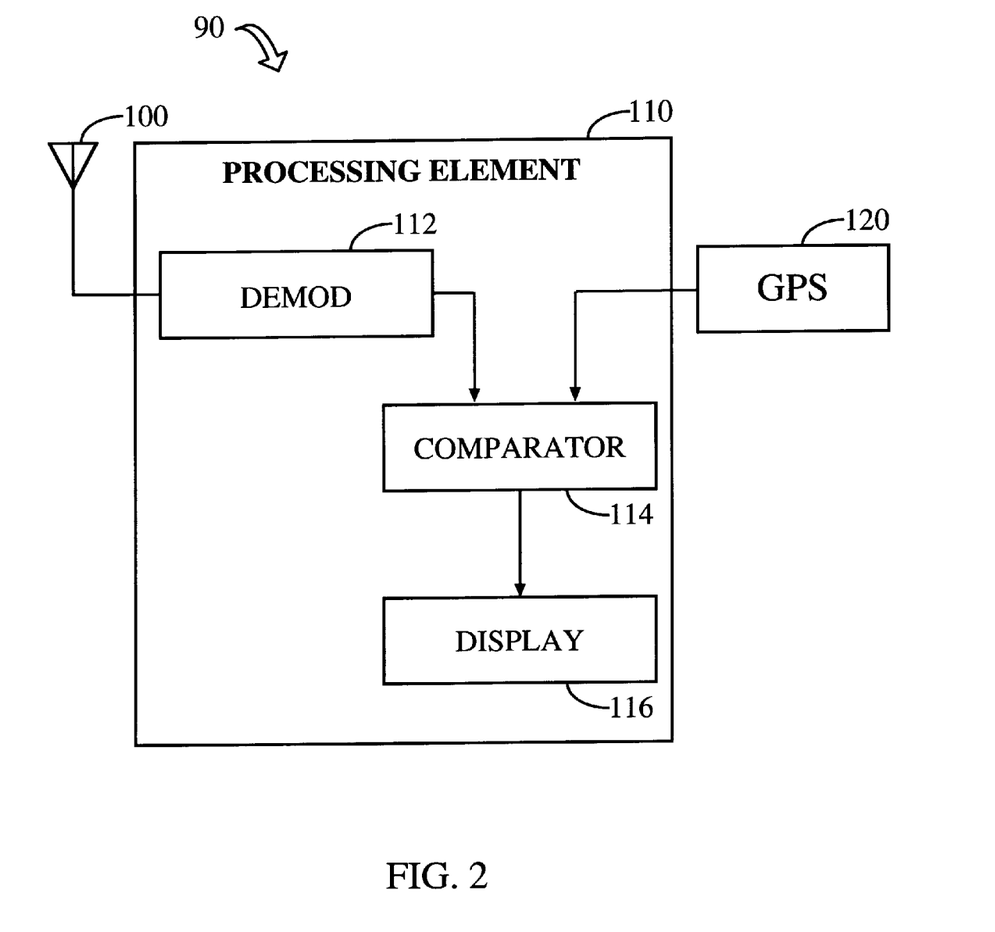
FIG. 2 is a block diagram of one embodiment of the present invention.

The present invention is a method and apparatus for analyzing base station timing. FIG. 2 is a block diagram of an exemplary embodiment of the present invention. A timing analyzer 90 preferably may move readily throughout the coverage area of a system. For example, the timing analyzer 90 may be installed in a van. The timing analyzer 90 is positioned as close as possible to the base station 10 such that an antenna 100 on the timing analyzer 90 is placed as close as possible to the antenna 60 of the base station 10.

Between the antenna 60 and the antenna 100, the signal travels at the speed of light. Obviously some fixed delay is always introduced by the use of a wireless link but the delay effects of the wireless link may be reduced to about 100 nanoseconds (ns) by the establishment of a direct, unobstructed path between the two antennas that is only about 30 meters in length.

The timing analyzer 90 receives the pilot signal transmitted by the base station 10. A processing element 110 provides the necessary functionality to determine the timing status of the base station 10. A demodulation element 112 searches for and demodulates the pilot signal in the same manner as a remote unit would. In order to ease the design task, the antenna 100 and the demodulation element 112 may comprise a portion of a standard remote unit. Further information on the operation of a demodulation element suitable for the present invention can be found in U.S. patent application Ser. No. 08/492,592, now U.S. Pat. No. 5,764,687 entitled "MOBILE DEMODULATOR ARCHITECTURE FOR A SPREAD SPECTRUM MULTIPLE ACCESS COMMUNICATION SYSTEM" which is assigned to the assignee of the present invention and incorporated herein. Further information about the demodulation process can be found in U.S. Pat. No. 5,490,165 entitled "Demodulation Element Assignment in a System Capable of Receiving Multiple Signals" which is assigned to the assignee of the present invention and incorporated herein.

The demodulation element 112 searches for the pilot signal in the same manner as a remote unit would but may need to expand its operation based on its diagnostic role. For example, the demodulation element 112 performs a first search at the nominal offset corresponding to the base station 10. If the pilot signal is not found at the first time offset, the searching element adds a delay to the designated offset and performs another search. If the pilot signal is not found again, additional delay increments may be added for subsequent searches.

In addition to adding delay increments, the timing analyzer 90 may subtract delay increments from the nominal offset. In normal operation a remote unit would not search any time offsets less than the nominal offset because the pilot signal can only be delayed, not advanced, as it is transmitted over the wireless link. However, because the timing analyzer 90 is used to determine the timing of both properly operating base stations and errant base stations, it may be advantageous to search for the pilot signal at offsets less than nominal so that such an errant pilot signal may be identified by the searching process. Typically the demodulation element 112 generates an indication of the time increment at which the searching process locates the pilot signal as well as an indication of the signal level at which the pilot signal is found.

A GPS receiver 120 within the timing analyzer 90 operates in the same manner as the GPS receiver 20 in the base station 10. Again, any other means of securing a reliable absolute time may be used. After the GPS receiver 120 has established its position in navigate mode, it enters timing mode and begins to supply an indication of absolute time to the processing element 110.

A comparator 114 within the processing element 110 corrects for the known time offset used by the base station 10 and, then, compares the corrected time to the absolute time from the GPS receiver 120. The comparator 114 outputs the resultant offset to a display 116. The display 116 may show the output by a single digital time value or it may provide a temporal energy display which shows the relative temporal position of the signal from the base station in relation to the absolute time reference. Additionally, the data could be logged to a data file for subsequent analysis.

The comparator 114 may also operate to detect drift in the signal. Because of the variety of factors which may influence the timing of a base station, only in very rare and chance instances will the comparator 114 indicate that the base station signal as received from the base station 10 and the absolute time signal are the same. However, whatever the measured timing difference between the two signals, the difference should remain constant over time if the base station 10 is operating properly.

In order to detect drift, the comparator 114 must observe the absolute time difference between the two signals over some prolonged time period such as a matter of hours. In another embodiment, the drift indication is a second output of the comparator 114 and typically has units such as nanoseconds/hour. Note that the time period may need to be shortened to detect a drift if the drift involves both a forward drift in time and a reverse drift in time which may compensate for one another if measured over an extended period of time.

The block diagram of FIG. 2 is highly simplified. For example, in reality the demodulation element 112 comprises RF and analog circuitry to convert the RF signal at the antenna 100 to a baseband signal in the same manner that such a conversion is made in a standard remote unit. In one embodiment, the RF and analog circuitry is comprised of a SAW filter which acts as a matched filter for the incoming waveform and filters out unwanted signals. Inherently this circuitry also introduces delay which must be compensated for by a calibration procedure. In the preferred embodiment, the comparator 114 also compensates for the delay introduced by the timing analyzer 90 itself. Such a calibration can be made in a stable factory environment before each timing analyzer is deployed.

Figure 3:
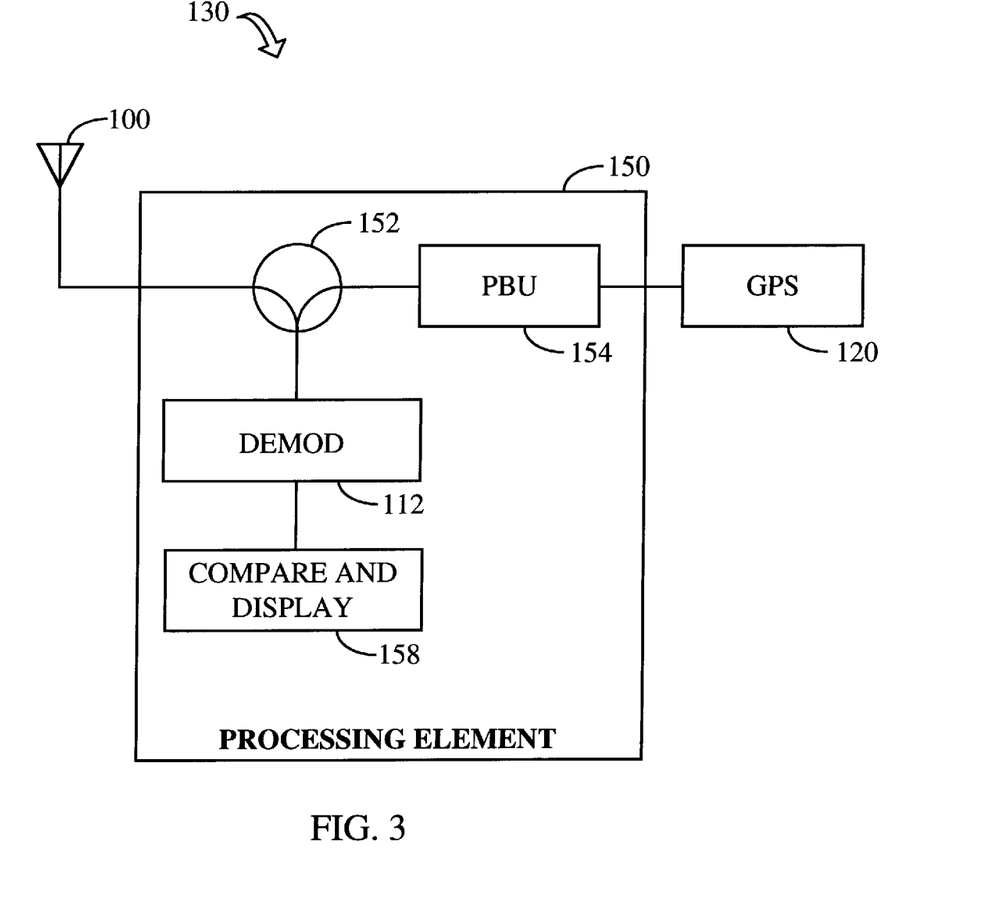
FIG. 3 is a block diagram of another embodiment of the present invention which does not require extensive calibration.

FIG. 3 is an alternative embodiment of the timing analyzer which avoids calibration of the greatest portion of the architecture. In FIG. 3, the GPS receiver 120 is used to drive a pilot beacon unit (PBU) 154. The PBU 154 is a simple unit which creates a pilot signal at the same frequency as the pilot signal from the base station 10. In the preferred embodiment, the PBU 154 generates the dummy pilot signal at a different time offset from the one used by the base station 10 so that the demodulation element 112 can differentiate and identify the two pilot signals. The PBU 154 generates the dummy pilot signal using similar processing steps as those used in the base station 10. Commercial pilot beacon units are marketed by QUALCOMM, Inc. of San Diego, Calif. including models QCPlus Pilot Beacon 800c, 1900e and 800e. Various systems for calibrating PBU are known including Hewlett Packard 892K and 8921C, which are used to measure timing from a time reference to the antenna port.

The summer 152 sums the base station pilot signal received through the antenna 100 with the dummy pilot signal created by the PBU 154. Just as a remote unit using the system is capable of searching for more than one pilot signal, the demodulation element 112 is capable of searching for and demodulating the pilot signal from the base station 10 as well as the dummy pilot signal from the PBU 154. The demodulation element 112 generates an indication of the time increment at which the searching process locates the pilot signal of the base station under test as well as the dummy pilot signal.

A compare and display unit 158 compares time offset of the pilot signal of the base station under test to the time offset of the dummy pilot signal. The compare and display unit 158 displays any resultant difference. The display may show the output by a single digital time value or it may provide a temporal energy display which shows the relative temporal position of the two signals. The compare and display unit 158 may also operate to detect drift in the signal. In an alternative embodiment of the invention compare and display unit 158 may be replaced or augmented with a storage unit to which measurement and other information may be stored for later analysis.

The great advantage of the configuration shown in FIG. 3 is that the circuitry of the timing analyzer 130 need not be calibrated to account for delays introduced by the majority of the processing element 150 circuitry. Any delay introduced by the demodulation element 112 and the summer 152 affects equally the dummy pilot signal and the pilot signal from the base station under test. Because the system operates by comparing the two signals, the system is self calibrating—both initially and over time.

Figure 4:
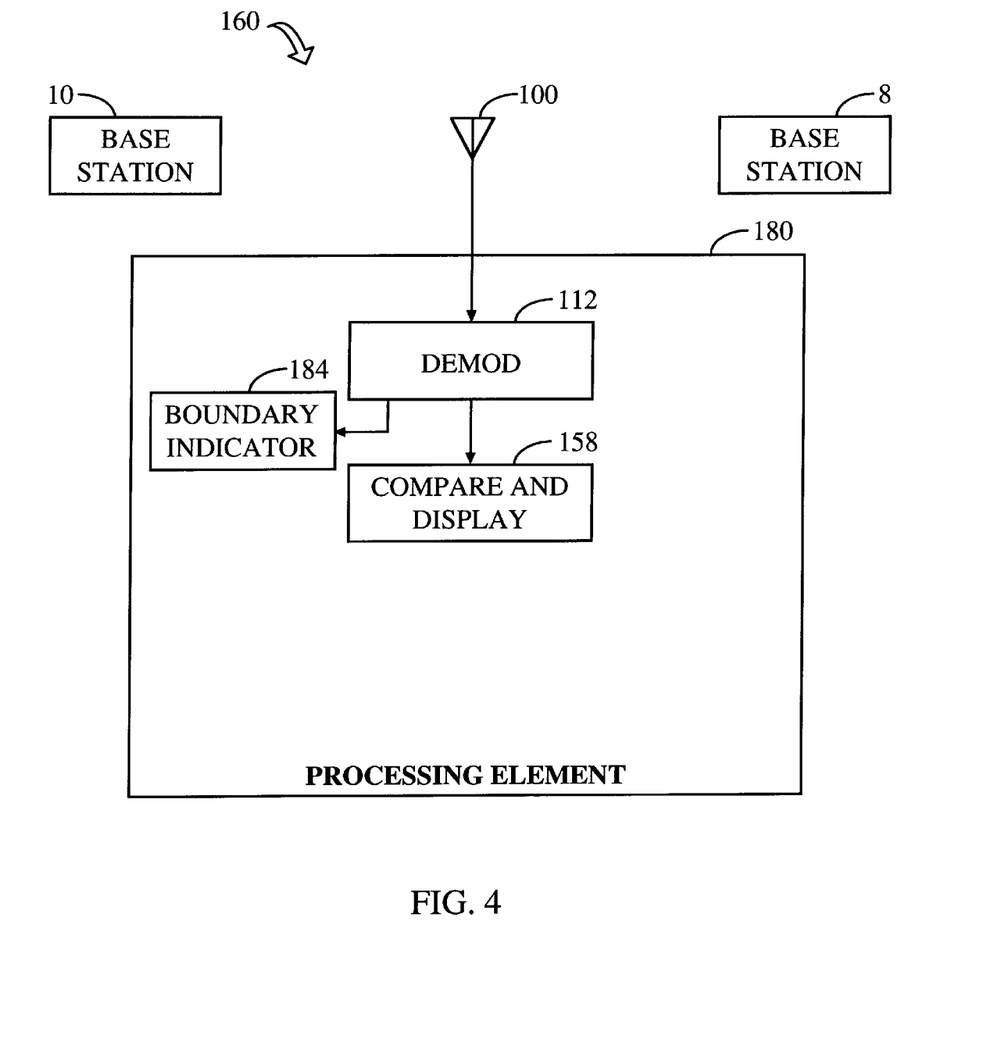
FIG. 4 is a block diagram of still another embodiment of the present invention which is less complex and less expensive than the embodiments of FIG. 2 and FIG. 3.

FIG. 4 is a block diagram showing a less complex and less expensive timing analyzer 160. Of note in the design of FIG. 4 is the elimination of both the need to calibrate and the use of a GPS receiver or other reference providing absolute time. A processing element 180 of the timing analyzer 160 may be comprised of a portion of a remote unit (shown in FIG. 4 as the antenna 100 and the demodulation element 112) attached to the comparator and display unit 158 and a boundary indicator 184.

Each base station in a system defines a coverage area. The base station is capable of communicating with remote units located within its coverage area. Within each coverage area are a plurality of handoff boundaries. A handoff boundary is defined as the physical location between two base stations where the link would perform the same regardless of whether the remote unit were communicating with the first or second base station.

In a CDMA system employing soft handoff, each handoff boundary is contained within a much wider soft handoff region. The pilot signal of each base station which defines the handoff boundary is easily detectable from within the soft handoff region. An active remote unit located in a soft handoff region is in communication with at least two base stations. As a remote unit travels throughout the coverage area of a system, it also moves into and out of various base station coverage areas and soft handoff regions. Communications remain uninterrupted during such movement by means of the soft handoff process.

Preferably, the timing analyzer 160 is placed at the handoff boundary between two base stations. For example, in FIG. 4, the timing analyzer 160 has been placed at the handoff boundary between a base station 8 and the base station 10. Typically, the handoff boundary between two base stations which are transmitting with the same power level is located at a point equidistance from each base station where equal link loss occurs. If the timing analyzer 160 is being used to detect drift, the exact placement of the antenna 100 is not as critical. But, if an absolute measurement is desired, the optimal location is one at which an unobstructed path from each of the two base stations to the antenna 100 is available. The antenna 100 does not need to be located with the processing element 180 and a long cable may connect the two without affecting the validity of the measurement. The antenna 100 may be mounted at the top of a utility pole or on the top of a building or mountain in order to obtain such an unobstructed view. Even if the environment does not permit placing the antenna 100 in a location with an unobstructed view from each base station, so long as the two paths from the base stations have similar characteristics (i.e. the same average density of trees, building, and auto traffic), the handoff boundary is a good estimation of an equi-distant, and hence, equi-delay, location. Also, the timing can be determined by calculation if the distance to the base station is known.

When the timing analyzer 160 is located at the handoff boundary, the timing analyzer receives the signal from each base station 8 and 10 with the same signal quality. Therefore, in order to use the timing analyzer 160, the timing analyzer 160 is moved about within the soft handoff region in search of the handoff boundary.

In one embodiment, the timing analyzer 160 aids in the proper placement at the handoff boundary by employing the boundary indicator 184. The demodulation element 112 demodulates the two pilot signals in the same manner a remote unit does. Therefore, the demodulation element 112 periodically produces an indication of the quality and time offset at which it encounters the pilot signal from each of the base stations. The demodulation element 112 passes the quality indications for each pilot signal to the boundary indicator 184. The boundary indicator 184 compares the signal quality of the two pilot signals. When the signal quality of the two signals is equal, the boundary indicator 184 indicates that the timing analyzer 160 is properly positioned at the handoff boundary.

When the signal quality comparison indicates that the base station is located at the handoff boundary, the boundary indicator 184 may trigger a small light or buzzer to alert a human operator. In addition or instead, the boundary indicator 184 may produce a digital or analog indication. The indication generated by the boundary indicator 184 may act as a trigger to the compare and display unit 158.

Once positioned at the handoff boundary, the demodulation element 112 continues to demodulate the pilot signal from both the base station 8 and the base station 10. The compare and display unit 158 performs the same function as the it did in association with the timing analyzer 130 of FIG. 3.

As with the timing analyzer 130, the timing analyzer 160 does not require calibration because the two pilot signals which are compared travel the same path within the timing analyzer 160. The measurements taken by the time analyzer 160 are still fairly accurate in spite of the elimination of a need for a GPS receiver.

The most advantageous use of the timing analyzer 160 is to monitor for drift. Because of the low cost nature of the timing analyzer 160, such a device may be permanently installed at handoff boundaries throughout the coverage area of a system. If the timing analyzer detects a drift in the timing of one base station with respect to the other base station, the timing analyzer may become active and send a message via the standard reverse link used in the CDMA system. The message indicates the type of failure and is sent to a system controller. The system controller can, thus, order a more precise measurement of the timing of the base station 8 and the base station 10 such as through the use of the timing analyzer 130.

Although the present invention is described herein as useful to diagnostically monitor the timing of a base station, the method and apparatus of the present invention may be directly applied to a calibration environment. In such a case, the timing analyzer is used to provide feedback as to the resultant output of the base station while adjustment to the timing is made within the base station itself such as within the base station time adjust unit 32 of FIG. 1.

Figure 5:
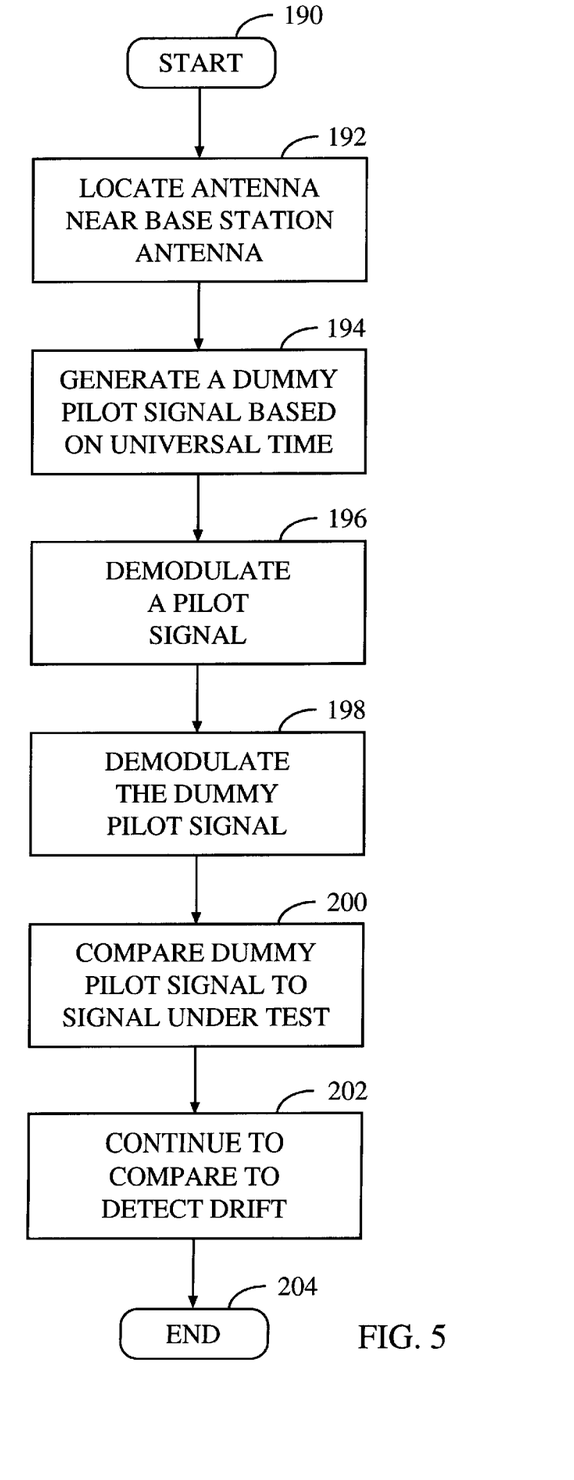
FIG. 5 is a flow chart showing a method of measuring base station timing.

FIG. 5 is a flow chart showing a method of operation in accordance with the present invention. Beginning in the start block 190, operation is described with reference to the timing analyzer 130 shown in FIG. 3 and the base station 10 shown in FIG. 1. In the block 192, the antenna 100 is placed near the antenna 60, preferably within about 30 meters. In block 194, the GPS receiver 120 provides an indication of absolute time to the pilot beacon unit 154. The pilot beacon unit generates a dummy pilot signal. In block 196, the demodulation element 112 demodulates a pilot signal received from the base station 10. In block 198, the demodulation element 112 demodulates the dummy pilot signal. In block 200, a comparison is made of the dummy pilot signal to the pilot signal from the base station 10 to determine the absolute timing of the base station 10. In block 202, the comparison continues to be made in order to detect drift in the timing of the base station 10. The flow ends in block 204.

Figure 6:
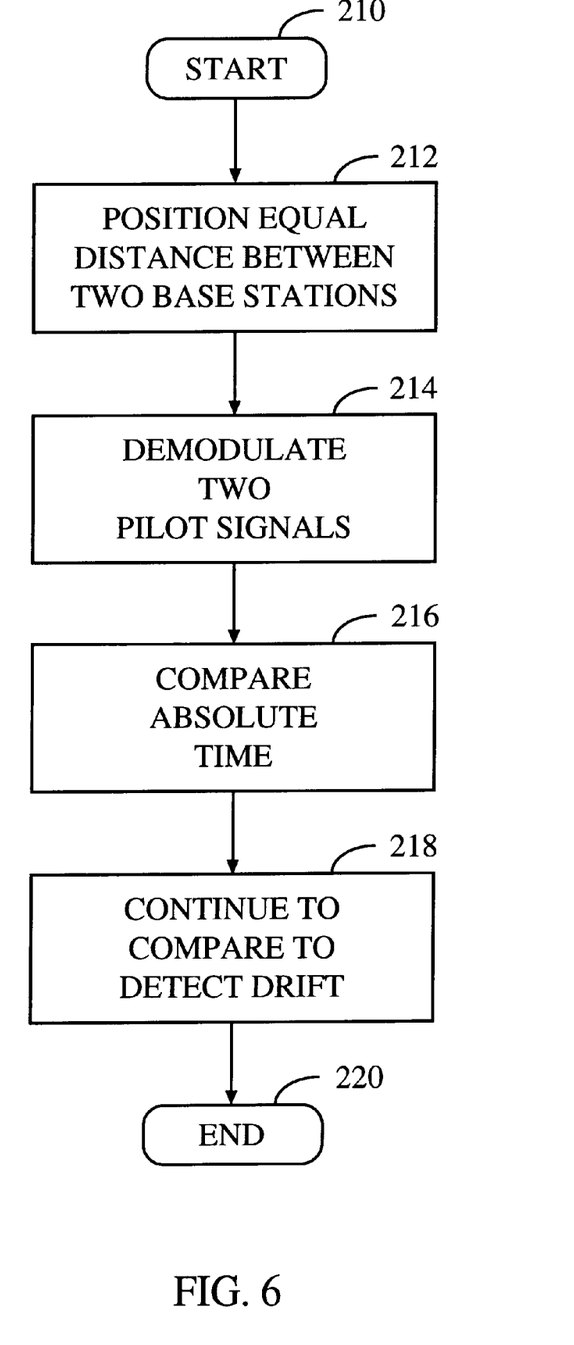
FIG. 6 is a flow chart showing another method of measuring base station timing.

FIG. 6 is a flow chart illustrating operation in accordance with another embodiment. Beginning in block 210, operation is described with reference to the timing analyzer 160 of FIG. 4. In block 212, the timing analyzer 160 is positioned at the handoff boundary between the base stations 8 and 10 as facilitated by the boundary indicator 184. In block 214, the demodulation element 112 is used to demodulate the pilot signal of both the base station 8 and the base station 10. In block 216, the compare and display unit 158 compares the timing of the two pilot signals and displays the result. In block 218, the comparison continues to be made in order to detect drift in the timing of the base station 8 or 10. The flow ends in block 220.

In the manner described above, the present invention, in each of the embodiments, produces a reliable and all inclusive determination of the timing of an operating base station. The invention can detect subtle systems failures which may be very difficult to detect by alternative means. For example, by checking log files gathered over a long period of time, slow timing drift can be detected. The present invention performs the test without interference with or degradation to the base station continual operation. Thus, the present invention satisfies the long felt need of the industry to have a comprehensive and precise method of measuring base station timing.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

What is claimed is:

1. An apparatus to determine a timing of a signal and a timing drift of the signal, if any, caused by a base station transmitting the signal, comprising:
   a dummy signal generation mechanism producing a dummy signal output;
   an antenna coupled to a wireless link and producing an antenna output;
   a summer coupled to said dummy signal output and said antenna output, said summer producing a summed signal output;
   a demodulation element coupled to said summed signal output and producing a demodulated dummy signal output and a demodulated signal output; and
   a signal timing comparison unit coupled to said demodulated dummy signal output and said demodulated signal output, said comparison unit used to compare signal timing for said demodulated dummy signal output to signal timing for said summed signal output.

2. The apparatus of claim 1, wherein said comparison unit provides an absolute error output and a drift error output.

3. The apparatus of claim 1, wherein said antenna is located a known distance from a second antenna associated with a base station under test.

4. The apparatus of claim 3, wherein said antenna associated with said base station under test receives a signal from said base station under test through a cable television system.

5. The apparatus of claim 3, wherein said antenna associated with said base station under test receives a signal from said base station under test through a fiber optic link.

6. The apparatus of claim 1, further comprising a display unit coupled to said demodulated dummy signal output and said demodulated signal output providing, in response thereto, a temporal energy output.

7. The apparatus of claim 1, wherein said dummy signal output produces a code division multiple access, spread spectrum signal.

8. The apparatus of claim 1, wherein said antenna output produces a pilot signal from a base station operating in a CDMA system.

9. The apparatus of claim 8, wherein said dummy signal output is a dummy pilot signal.

10. The apparatus of claim 9, wherein said pilot signal from said base station is spread using a first spreading sequence at a first time offset and said dummy pilot signal is spread using said first spreading sequence at a second time offset.

11. An apparatus to determine a timing of a signal and a timing drift of the signal, if any, caused by a base station transmitting the signal, comprising:
    means for receiving a signal generated by an operating base station;
    means for receiving a reference signal;
    means for identifying a signal time offset of said signal generated by said operating base station;
    means for identifying a reference time offset of said reference signal; and
    means for determining a timing characteristic of said operating base station based on said signal time offset and said reference time offset.

12. The apparatus claim 11, wherein said timing characteristic comprises an absolute offset in time.

13. The apparatus of claim 11, wherein said timing characteristic comprises a drift in timing.

14. The apparatus of claim 11, wherein said reference signal is generated for testing purposes.

15. The apparatus of claim 11, wherein said reference signal is generated by a second operating base station.

16. The apparatus of claim 11, further comprising means for comparing a signal quality of said reference signal to a signal quality of said signal generated by said operating base station to determine a proper location of said means of receiving said signal generated by said operating base station.

17. The apparatus of claim 11, further comprising means for adjusting a calibration setting of said operating base station.

18. The apparatus of claim 11, wherein said signal generated by said operating base station is a code division multiple access pilot signal.

19. The apparatus of claim 18, wherein said reference signal is a dummy pilot signal.

20. The apparatus of claim 19, wherein said code division multiple access pilot signal is spread using a first spreading sequence at a first time offset and said dummy pilot signal is spread using said first spreading sequence at a second time offset.

21. An apparatus to determine a timing of a signal and a timing drift of the signal, if any, caused by a base station transmitting the signal, comprising:
    an absolute time generation mechanism configured to provide an absolute time reference;
    an antenna configured to receive a base station signal from a wireless link;
    a demodulation element coupled to said antenna and configured to demodulate said base station signal to extract an indication of base station signal timing therefrom; and
    a comparator configured to compare said indication of base station signal timing and said absolute time reference to detect an offset error, if any, therebetween.

22. A method to determine a timing of a signal and a timing drift of the signal, if any, caused by a base station transmitting the signal, comprising the steps of:
    receiving a signal generated by an operating base station;
    receiving a reference signal;
    identifying a signal time offset of said signal generated by said operating base station;
    identifying a reference time offset of said reference signal;

comparing said signal time offset to said reference time offset, and determining a timing characteristic of said operating base station based on said comparison.

23. The method of claim 22 wherein said reference signal is generated for testing purposes.

24. The method of claim 22 wherein said reference signal is generated by a second operating base station.

25. The method of claim 24 further comprising the step of comparing a signal quality of said reference signal to a signal quality of said signal generated by said operating base station to determine a proper location at which to perform said step of receiving said signal generated by said operating base station.

26. The method of claim 22 wherein said signal generated by said operating base station is a code division multiple access pilot signal.

27. The method of claim 26 wherein said reference signal is a dummy pilot signal.

28. The method of claim 27 wherein said code division multiple access pilot signal is spread using a first spreading sequence at a first time offset and said dummy pilot signal is spread using said first spreading sequence at a second time offset.

29. The apparatus of claim 1, wherein said antenna communicates with a second antenna associated with a base station under test through a repeater.

* * * * *